United States Patent [19]

Givler

[11] Patent Number: 4,495,969
[45] Date of Patent: Jan. 29, 1985

[54] MIXING VALVE WITH WATER MODULATION SEALING MEANS

[75] Inventor: John D. Givler, Avon Lake, Ohio
[73] Assignee: Stanadyne, Inc., Windsor, Conn.
[21] Appl. No.: 536,229
[22] Filed: Sep. 28, 1983

Related U.S. Application Data

[63] Continuation of Ser. No. 323,925, Nov. 23, 1981.

[51] Int. Cl.³ .............................................. F16K 11/02
[52] U.S. Cl. ............................ 137/625.17; 137/625.4; 137/607
[58] Field of Search ........... 137/625.17, 625.4, 625.41, 137/607

[56] References Cited

U.S. PATENT DOCUMENTS

| | | | |
|---|---|---|---|
| 1,357,294 | 11/1920 | McKee | 137/625.17 |
| 1,498,788 | 6/1924 | Deming | 137/607 |
| 1,502,147 | 7/1924 | McDuffie | 137/607 |
| 3,277,921 | 10/1966 | Cornelius | 137/607 |
| 3,285,278 | 11/1966 | Corlett | 137/454.2 |
| 3,726,317 | 4/1973 | Moen | 137/625.17 |
| 3,835,887 | 9/1974 | Mongerson et al. | 137/625.41 |
| 3,840,048 | 10/1974 | Moen | 137/625.41 |
| 3,888,459 | 6/1975 | Bubniak | 251/208 |
| 3,916,950 | 11/1975 | Mongerson et al. | 137/625.41 |

FOREIGN PATENT DOCUMENTS 1963451  6/1971  Fed. Rep. of Germany .

Primary Examiner—Alan Cohan
Assistant Examiner—John A. Rivell
Attorney, Agent, or Firm—Kinzer, Plyer, Dorn & McEachran

[57] ABSTRACT

A mixing valve utilizes a sleeve having hot and cold water inlet ports and outlet ports therein. A valve member is reciprocal and rotatable within the sleeve to control the temperature and volume of water passing through the outlet ports. There are port seals positioned in the sleeve hot and cold water inlet ports, which port seals are in sealing contact with the valve member and have openings therein through which pass the inlet water flow of the valve. The cold water port seal opening has a cross sectional area less than that of the hot water port seal opening and there is a restricted passage in the cold water port seal controlling the access of water to the cold water port seal opening.

13 Claims, 8 Drawing Figures

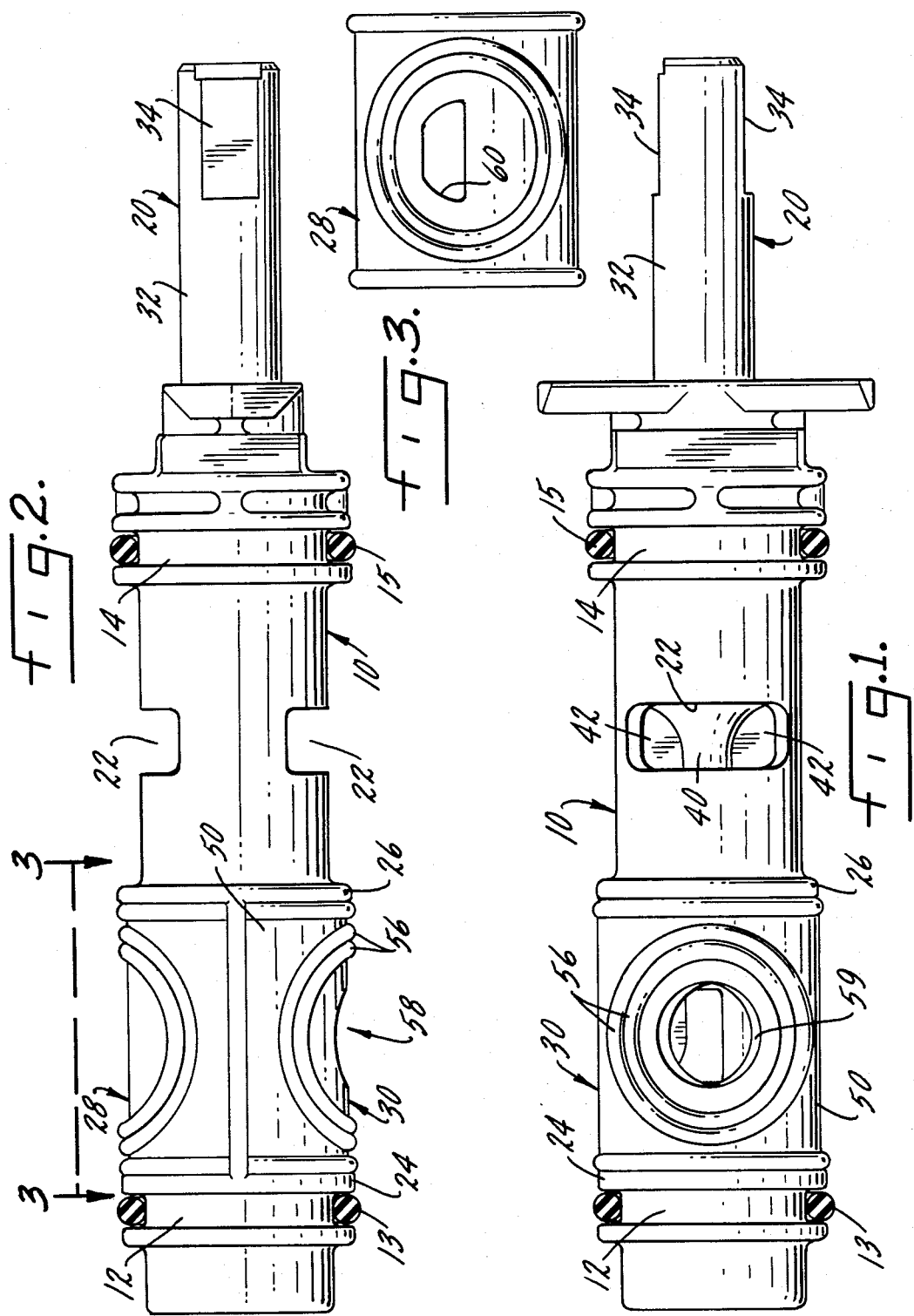

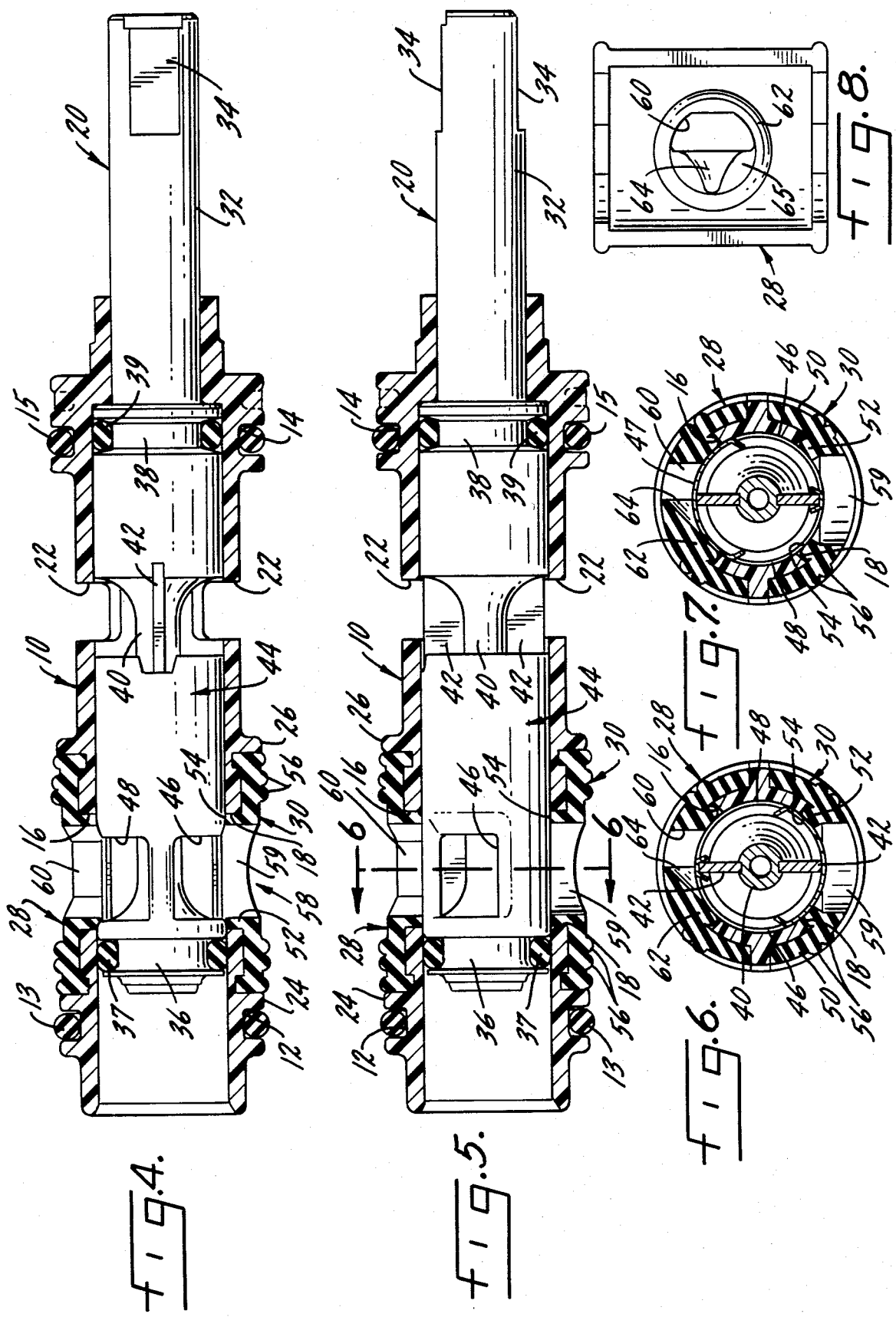

4,495,969

MIXING VALVE WITH WATER MODULATION SEALING MEANS

This application is a continuation, of application Ser. No. 323,925, filed Nov. 23, 1981.

SUMMARY OF THE INVENTION

The present invention relates to mixing valves and in particular to mixing valves which provide for restricted water passage through the cold water inlet port thereby modulating the temperature of water flowing through the valve to provide a greater degree of valve control in the so-called comfort zone.

A primary purpose of the invention is a mixing valve usable in areas having substantially greater cold water pressure than hot water pressure and in which there are water modulation means therein so that the valve has a larger comfort zone for valve manipulation.

Another purpose is a valve of the type described in which the cold water port restricts the volume of water passing therethrough so as to provide a greater degree of valve operation in a zone in which hot and cold water is mixed to a temperature providing body comfort.

Another purpose is a valve of the type described in which the port seals, providing the valve closure, have openings therein, with the cold water opening being smaller than the hot water opening and with there being a passage of restricted size which provides access to the cold water opening, thereby providing a degree of temperature modulation permitting the valve to be used in areas where cold water pressure is substantially above that of the hot water supply.

Other purposes will appear in the ensuing specification, drawings and claims.

BRIEF DESCRIPTION OF THE DRAWINGS

The invention is illustrated diagrammatically in the following drawings wherein:

FIG. 1 is a side elevational view of the valve in the mixing position,

FIG. 2 is a top plan view of FIG. 1,

FIG. 3 is a side elevational view of the cold water seal as viewed along line 3—3 of FIG. 2, FIG. 4 is an axial section of the valve of FIG. 2 shown in the mixing position, FIG. 5 is an axial sectional view with the valve shown in the cold open/hot closed position, FIG. 6 is a section taken along line 6—6 of FIG. 5, FIG. 7 is a sectional view, similar to FIG. 6, with the valve shown in the cold closed/hot open position, and FIG. 8 is an inside view of the cold water seal of FIG. 3.

DESCRIPTION OF THE PREFERRED EMBODIMENT

The present invention relates to mixing valves in which manipulation of a valve member controls the temperature and volume of water passing through the valve. Such valves have common application in residential plumbing, particularly in kitchen and lavatory faucets and in shower and tub valves. In particular, the present invention is directed to such a valve which is usable in areas in which the cold water supply has a substantially greater pressure than that of the hot water supply. For example, it is not unknown in some areas of the world for the cold water supply to be at a pressure as much as twelve times higher than that of the hot water supply. A more conventional pressure differential might be an 8 to 1 ratio, but even such a pressure differential makes it difficult for the valve user to have any substantial degree of valve control in the so-called "comfort zone" which is normally considered to be that range of temperatures which are usable for a satisfactory shower. It is most advantageous in a mixing valve, particularly one in a shower area, to permit the user to have a substantial degree of valve control in the comfort zone (normally 90°–106° F.) so that the water temperature setting for a comfortable shower or other use of the valve is not in any sense critical or difficult to make.

The present invention provides a valve structure which is usable in areas in which there is a substantial pressure differential between hot and cold water by restricting the passage of cold water through the valve and by providing a controlled access of cold water into the valve when the valve is moved from a full hot position toward a position of mixed hot and cold water. Further, the valve provides a structure which prevents cross flow between the hot and cold water inlet ports, which cross flow can be a serious problem in areas where the cold water pressure is substantially above that of the hot water supply.

The invention will specifically be described in connection with a mixing valve in which there is a reciprocal and rotatable valve member or stem positioned within a fixed sleeve. The restricted water flow device is in the form of a seal member which provides the valve closing seal. It should be understood that the principles described herein may have application in other types of valve constructions and the invention is not limited to a construction in which there is a stem or valve member movable within a cylindrical sleeve.

In the drawings, a sleeve is indicated generally at 10 and the stem is indicated generally at 20. The sleeve is hollow and has outside O-ring grooves 12 and 14 which accommodate O-rings 13 and 15, respectively, which O-rings or seal members are utilized to seal opposite ends of the valve structure. In this connection, the valve shown herein is in the form of a cartridge in that all of the movable parts of the valve are within a single self-contained unit which is normally positioned within a faucet housing. The sleeve has cold and hot water inlet ports 16 and 18, respectively, and outlet ports 22.

The exterior of the sleeve has annular shoulders 24 and 26 which define between them a circumferential space which contains the port seals for the valve, with the cold water port seal being indicated at 28 and the hot water port seal being indicated at 30. Details of the seal construction are illustrated in U.S. Pat. No. 3,840,048.

Stem 20 includes a shaft portion 32 which extends outwardly from the sleeve and has suitable flats 34 which will receive an operating handle for use in manipulating the valve. There are spaced grooves 36 and 38 on stem 20 which contain seal rings 37 and 39, respectively, with the exterior of the seal rings being in sealing engagement with the interior of sleeve 10.

The stem includes an undercut 40, circumferential in form, and extending a substantial portion of the stem length, which undercut provides the means for conveying water from cold and hot water ports 16 and 18 to sleeve outlet ports 22. Undercut 40 is divided into two water paths, one for hot water and one for cold water, by a divider structure indicated at 42 which extends generally the length of undercut 40. The divider structure consists of two vanes or dividers each of which is positioned in appropriate notches in opposite ends of undercut 40.

The stem includes a piston member, cylindrical in form, and indicated at 44, which extends about a portion of undercut 40 and which has separated openings 46 and 48 therein. These openings may be placed in register with cold and hot water inlet ports 16 and 18 when the valve is used to control the volume and temperature of water passing therethrough. The peripheral areas about openings 46 and 48 may be coined inwardly so that when the valve member or stem is moved relative to the port seals, there is a smooth bearing surface for the port seals and there is no likelihood that the seals could be cut or otherwise worn.

Hot water seal 30 is substantially the same as illustrated in U.S. Pat. No. 3,840,048 and includes a semicircular body portion 50 and a port seal portion 52 with the inner peripheral rim 54 of port seal portion 52 being in sealing contact with piston 44. There are a plurality of outwardly-extending beads 56 on the exterior of body 50, which beads will define a chamber 58 in register with hot water port 18 to the end that water flowing into the hot water port and into chamber 58 creates an inwardly-directed bias or force upon port seal portion 52 to provide a firm seal between the seal and stem piston. The opening 59 for hot water seal 30 is generally circular in cross section.

Cold water seal 28 (FIGS. 3 and 8) is the same as the hot water seal except for the arrangement of the opening through which water flows. Opening 60 is substantially less in cross sectional area than opening 59 in hot water seal 30 and may be on the order of about 50 percent of the size of the opening in the hot water seal. The invention should not be limited to any particular relationship between the hot and cold water openings, but it is necessary to substantially restrict the size of the cold water opening relative to the size of the hot water opening. In addition to providing an opening smaller in size than the hot water port, port seal portion 62 of cold water seal 28 is closed in the area opposite to that of opening 60 and there is a V-shaped notch 64 in the closed area. The notch has its smallest side away from opening 60 with the notch or restricted opening gradually increasing in size or in cross sectional area toward opening 60. The notch does not extend completely through the closed area and in fact the closed area has a roof indicated at 65. The roof on the notch tends to resist the normal tendency, under water pressure, for the sides of the notch to cave in or close, thus restricting the size of the opening. The roof maintains the notch with a uniform cross section under any type of water pressure.

Although the application has been described as providing a restriction on the cold water port, and a normal or unrestricted seal on the hot water port, it could be otherwise. The problem of pressure differential is normally associated with a water system in which the cold water pressure is substantially above that of the hot water supply. However, there may be some instances, perhaps rare, where the hot water pressure may be substantially greater than that of the cold water supply. Thus, the invention is specifically directed to a seal which reduces flow at the high pressure side, whether it be the hot or cold water supply.

When the valve is assembled and is properly located in a faucet construction, the relative position and arrangement of the port seal openings and stem openings 46 and 48 permit specific water flow ratios. When the stem is in the position of FIG. 7 to permit full flow through the hot water port, the cold water port is closed by the major portion of piston 44 between openings 46 and 48 and designated at 47. As the stem is rotated clockwise toward a position in which cold water will flow through seal opening 60, initially such rotation places opening 48 in piston 44 into communication with the smallest portion of notch 64. Continued rotation of the stem in a clockwise direction, which conventionally will be from full hot toward a mixed position, places opening 48 in the piston in gradually increased communication with notch 64. Continued rotation in a clockwise direction will place both openings 59 and 60 (FIG. 4) in full register with openings 46 and 48 in piston 44. By placing the notch in the cold water port seal in this particular disposition relative to the openings in the piston, it is possible to initially pass a small amount of cold water into the valve along with the full flow of hot water. Continued rotation increases the amount of cold water, but does so in relatively small amounts. This is particularly important in areas in which cold water pressure greatly exceeds the available hot water pressure. Accordingly, there is a greater degree of handle rotation in the so-called comfort zone. In fact, with a valve such as shown herein it is possible to have in the area of about 19° of handle rotation in the comfort zone which is normally considered to be that zone in which there is a substantial mixture of hot and cold water.

Of further advantage is the fact that when the hot water port is closed (FIGS. 5 and 6), opening 48 is fully in register with port seal opening 60 so that there may be a complete supply of cold water without use of notch 64. Thus, notch 64 is only utilized when there is a mixture of hot and cold water and when the user begins to move the valve toward a mixed position from either the full hot or full cold positions. The opening in the cold water port seal is completely accessible to the valve stem opening when the valve is in a full cold position.

The divider structure, separating the hot and cold water inlets, is particularly important when the valve is used in an area of relatively high cold water pressure. Otherwise, with a substantial differential between hot and cold water pressures, it might be impossible to have any hot water enter the valve.

Whereas the preferred form of the invention has been shown and described herein, it should be realized that there may be many modifications, substitutions and alterations thereto.

The embodiments of the invention in which an exclusive property or privilege is claimed are defined as follows:

1. In a mixing valve having a stationary member and a movable member with relative movement therebetween controlling the volume and temperature of water passing therethrough, a hot water inlet port and a cold water inlet port in said stationary member, seal members positioned in said inlet ports and each having an opening therein which controls the flow of water therethrough, one of said port seal openings having a cross sectional area less than that of said other port seal opening, said one port seal further having a restricted passage, gradually increasing in size toward said opening, controlling the access of water to said seal opening.

2. The structure of claim 1 further characterized by and including divider means separating said hot and cold water inlet ports, preventing cross flow therebetween.

3. The structure of claim 1 further characterized in that said restricted passage is in the form of a generally V-shaped notch.

4. The structure of claim 3 further characterized in that said generally V-shaped notch has a covering therefor.

5. In a mixing valve having a sleeve, hot and cold water inlet ports and outlet ports therein, a valve member reciprocal and rotatable within said sleeve to control the temperature and volume of water flow through said sleeve, port seals positioned in said sleeve hot and cold water inlet ports and in sealing contact with said valve member, each of said port seals having an opening therein which controls the flow of water therethrough, with one of said port seal openings having a cross sectional area less than that of said other port seal opening said one port seal further having a restricted passage, gradually increasing in size toward said opening, controlling the access of water to said opening.

6. The structure of claim 5 further characterized by and including divider means positioned within said valve member and preventing the flow of water from said cold water port directly to said hot water port.

7. The structure of claim 5 further characterized in that said valve member includes port areas movable into register with said port seal openings, with said valve member port areas being disposed to permit full flow through said cold water opening when said hot water port opening is closed by said valve member, and to permit restricted flow through said cold water port seal passage when said hot water port is full open.

8. The structure of claim 5 further characterized in that said valve member includes port areas movable into register with said port seal openings, with said valve member port areas being disposed to permit full flow through said hot water port seal opening and no flow through said cold water port seal opening, at a particular position of said valve member, with movement of said valve member toward a position whereby both hot and cold water will flow through said port seal openings causing the first flow of cold water to be through said restricted passage.

9. The structure of claim 5 further characterized in that said seals each include a body portion circumferentially positioned about said sleeve, and a port seal portion extending through said sleeve hot and cold water inlet ports and into sealing engagement with said valve member, said restrictive passage being in the form of a notch formed in said port seal portion of said cold water port seal.

10. The structure of claim 5 further characterized by and including a cover for said restricted passage, said cover preventing collapse of said restricted passage due to water pressure thereon.

11. In a mixing valve having a stationary member and a movable member with relative movement therebetween controlling the volume and temperature of water passing therethrough, a hot water inlet port and a cold water inlet port in said stationary member, seal members positioned in said inlet ports and each having an opening therein which controls the flow of water therethrough, one of said port seal openings having a cross sectional area less than that of said other port seal opening, said one port seal further having a variably sized restricted passage controlling the access of water to said seal opening, said movable member including port areas movable into register with said port seal openings, with said movable member port areas being disposed to permit full flow through said cold water opening when said hot water opening is closed by said movable member and to permit restricted flow through said cold water port seal passage when said hot water port is full open.

12. In a mixing valve having a stationary member and a movable member with relative movement therebetween controlling the volume and temperature of water passing therethrough, a hot water inlet port and a cold water inlet port in said stationary member, seal members positioned in said inlet ports and each having an opening therein which controls the flow of water therethrough, one of said port seal openings having a cross sectional area less than that of said other port seal opening, said one port seal further having a variably sized restricted passage controlling the access of water to said seal opening, said movable member including port areas movable into register with said port seal openings, with said movable member port areas being disposed to permit full flow through said hot water port seal opening and no flow through said cold water port seal opening, at a particular position of said movable member, with movement of said movable member toward a position whereby both hot and cold water will flow through said port seal openings causing the first flow of cold water to be through said restricted passage.

13. In a mixing valve having a stationary member and a movable member with relative movement therebetween controlling the volume and temperature of water passing therethrough, a hot water inlet port and a cold water inlet port in said stationary member, seal members positioned in said inlet ports and each having an opening therein which controls the flow of water therethrough, one of said port seal openings having a cross sectional area less than that of said other port seal opening, said one port seal further having a restricted passage opening, controlling the access of water to said seal opening, said seals each including a body portion circumferentially positioned about said stationary member and a port seal portion extending through said stationary member hot and cold water inlet ports and into sealing engagement with said movable member, said restricted passage being in the form of a notch formed in said port seal portion of said cold water port seal.

* * * * *